Patented Dec. 22, 1931

1,837,555

UNITED STATES PATENT OFFICE

EDOUARD M. KRATZ, OF CHICAGO, ILLINOIS

SHEET MATERIAL

No Drawing.    Application filed June 28, 1929. Serial No. 374,620.

This invention relates to sheet material and more particularly to thin, transparent sheet material of a clear, sparkling nature and substantially moisture proof. Such material is especially adapted for use in the wrapping of candy, bonbons, foods, and other perishable goods on account of its moisture proof quality and the pleasing appearance produced by its clear transparency.

Thin transparent sheets of a gelatine composition have heretofore been made for use as wrapping materials and have served fairly satisfactorily for this purpose. But where a relatively high degree of resistance to moisture is desired, the ordinary gelatine composition sheets have not proved entirely satisfactory owing to their lack of resistance to penetration by moisture.

Attempts have been made with some success to render gelatine and gelatine composition films waterproof by coating them with cellulose esters, such as cellulose nitrate and acetate, but the cellulose esters are in themselves fairly expensive and furthermore require the use of relatively expensive solvents. Moreover, in using cellulose ester solutions a fairly high ratio of solvent to the cellulose ester, sometimes as high as 10 to 1, must be employed to prevent "blushing" or "bloom" in the finished coating.

It is therefore an object of this invention to provide thin, transparent sheet material having a gelatine or gelatine composition base with a coating formed thereon of materials adapted to render the sheet highly resistant to moisture penetration without in any way destroying its high degree of flexibility and toughness.

It is a further important object of this invention to provide a coating composition for gelatine films that can be prepared relatively cheap using inexpensive solvents that need not be recovered to render the coating process economically practicable and that may be used in a relatively low ratio to the solid content of the coating composition without danger of causing "blushing" or "bloom."

Other and further important objects of this invention will become apparent from the following description and appended claims.

The sheet material of my invention may have for its base either a straight gelatine film or a gelatine composition film, such as gelatine and ethylene glycol and a grease dispersing agent as disclosed in my copending application entitled "Transparent sheet material", Serial No. 213,225, filed August 15, 1927, or a gelatine-sulphonated oil composition, such as disclosed in my copending application Serial No. 10,962. The base may contain glycerine and tanning agents, such as formaldehyde or the like and may be suitably colored if desired.

My coating composition for such a base contains a vinyl compound dissolved in a suitable solvent or mixture of solvents. Vinyl chloride and vinyl acetate are examples of suitable vinyl compounds, the former giving especially water resistant properties to the coating. These compounds are at ordinary temperatures, solid and are first dissolved in an organic solvent, or a mixture of solvents, preferably including solvents of the coal tar hydrocarbons, such as benzene and its homologues. It is advantageous to add to the coal tar hydrocarbons used as solvents another solvent that is miscible with water, such as acetone or ethyl acetate.

Various plasticizers of the type used in the manufacture of pyroxylin, such as tricresyl phosphate, esters of phthalic acid including butyl and dibutyl phthalate and the like may be used. Similarly, various pyroxylin solvents of low boiling point can be employed but these are not preferred to the hydrocarbons of the benzene series since they retard the drying operation. A glycol can be used in the coating composition as well as in the base itself and this is true of plasticizers generally. Where moisture proofing is not so essential, high boiling point plasticizers such as the monoethyl ether of ethylene glycol, ethylene glycol and diethylene glycol, may be used.

It is also desirable to add a gum or resin to the coating solution. In general, any common gum or fossil resin such as dammar, cumar, Pontianac, sandarac, kauri and the like may be used. Certain artificial resins and resinous polymerization products, such as the glyptals or resyls, can likewise be employed.

Either vinyl acetate or vinyl chloride can be used alone without the other or used together in various proportions. Where vinyl acetate is used without vinyl chloride, the addition of a resyl, a polymerization product of glycerine with phthalic anhydride and oleic acid, gives a satisfactory film. In using vinyl chloride alone without the vinyl acetate, the addition of a soft resyl, known as resyl balsam and being a semi-polymerized glyptal, is desirable.

Without limiting my invention to any specific composition of coating, the following illustrates a preferred composition:

10 parts of vinyl chloride and vinyl acetate (4 to 1).

40 parts of a solvent comprising 75% acetone, 20% toluene, 2½% tri-cresyl phosphate and 2½% ethyl acetate.

2 to 5 parts of a resyl.

The acetone serves not only as a solvent for the vinyl compound but also as a binding agent between the composition forming the coating and the base composition, since acetone being miscible with water has a slight solvent action toward the gelatine composition base. The addition of a gum resin, or resyl to the coating composition also aids in the binding of the coating material to the base and increases the moisture resisting properties of the film, as well as assists in giving a smooth film.

The coating material is preferably applied by dipping the base film in the coating bath and then passing the coated film vertically to allow the excess of coating material to run back into the bath. The coated film is then run through a drier where the solvents are evaporated and the coating allowed to harden. The coating may likewise be applied by means of a doctor or by means of rolls.

The finished product is a thin, clear, transparent sheet material having a high degree of resistance to moisture and being very flexible and tough. Such material is especially adapted for use in wrapping candy and other food products of a perishable nature where it is important that they be kept away from atmospheric moisture.

I am aware that numerous details of the process may be varied through a wide range without departing from the principles of this invention, and I, therefore, do not propose limiting the patent granted hereon otherwise than necessitated by the prior art.

I claim as my invention:

1. A transparent sheet containing gelatine and having a coating thereon containing a vinyl compound.

2. A transparent sheet containing gelatine and having a coating thereon containing vinyl chloride.

3. A transparent sheet containing gelatine and having a coating thereon containing vinyl chloride and vinyl acetate.

4. A transparent sheet containing gelatine and having a coating thereon containing vinyl chloride and vinyl acetate in the proportion of about 4 parts of vinyl chloride to 1 part of vinyl acetate.

5. A relatively moisture proof, transparent gelatine composition sheet having a coating thereon comprising a vinyl compound, a solvent therefor and a plasticizer.

6. A relatively moisture proof, transparent gelatine composition sheet having a coating thereon comprising a vinyl compound, a solvent therefor, a resinous material and a plasticizer.

7. A relatively moisture proof, transparent gelatine composition sheet having a coating thereon comprising a vinyl compound, a solvent therefor, a resyl and a plasticizer.

8. A relatively moisture proof, transparent gelatine composition sheet having a coating thereon comprising a mixture of vinyl chloride and acetate, a solvent therefor and a plasticizer.

9. A relatively moisture proof, transparent gelatine composition sheet having a coating thereon comprising a mixture of vinyl chloride, vinyl acetate, acetone and a plasticizer.

10. A relatively moisture proof, transparent gelatine composition sheet having a coating thereon comprising a mixture of vinyl chloride, vinyl acetate, acetone and tri-cresyl phosphate.

11. A transparent sheet having a base comprising gelatine and a sulphonated oil and a coating containing a vinyl compound adapted to render the sheet moisture proof.

12. A transparent sheet having a base comprising gelatine and a sulphonated oil and a coating containing a vinyl compound adapted to render the sheet moisture proof and a resinous substance.

13. A transparent sheet having a base comprising gelatine and a sulphonated oil and a coating containing a vinyl compound adapted to render the sheet moisture proof and a resyl.

14. A transparent sheet having a base comprising gelatine, ethylene glycol and sulphonated castor oil and a coating containing a vinyl compound adapted to render the sheet moisture proof.

In testimony whereof I have hereunto subscribed my name at Chicago, Cook County, Illinois.

EDOUARD M. KRATZ.